United States Patent [19] [11] 4,085,299
Hobrough [45] Apr. 18, 1978

[54] PEAK AMPLITUDE PROTECTION SYSTEM FOR RIBBON LOUDSPEAKERS

[76] Inventor: Gilbert L. Hobrough, P.O. Box 35369, Vancouver, British Columbia, Canada

[21] Appl. No.: 809,534

[22] Filed: Jun. 24, 1977

[51] Int. Cl.² .............................................. H04R 3/00
[52] U.S. Cl. .................................... 179/184; 179/1 R
[58] Field of Search .................... 179/1 R, 115 V, 184

Primary Examiner—George G. Stellar
Attorney, Agent, or Firm—Robert L. Nathans

[57] ABSTRACT

A current limiting capacitor together with a special impedance matching transformer, is inserted between a power amplifier and the input terminals of a ribbon loudspeaker, such transformer having a sharply saturable magnetic core which limits the time integral of the voltage of the audio signal applied to the ribbon of the ribbon loudspeaker to a safe value for providing protection of the ribbon from excessive peak amplitudes.

10 Claims, 1 Drawing Figure

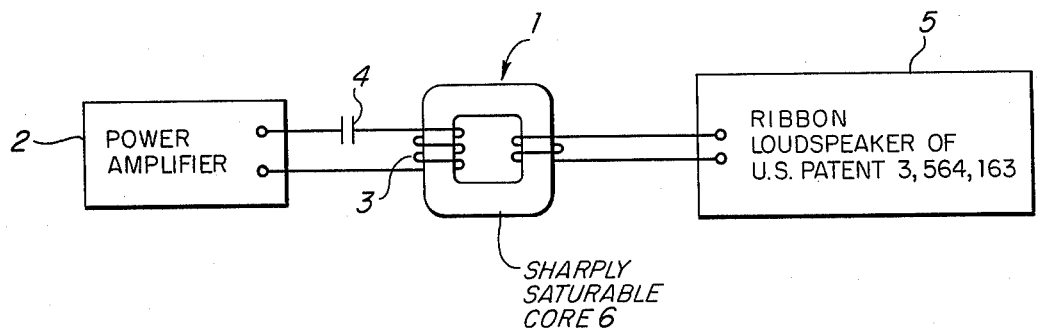

PEAK AMPLITUDE PROTECTION SYSTEM FOR RIBBON LOUDSPEAKERS

BACKGROUND OF THE INVENTION

Although ribbon loudspeakers are capable of being designed having truly outstanding fidelity, a number of serious problems are associated with such ribbon loudspeakers. In my U.S. Pat. No. 3,564,163, incorporated by reference herein, I teach a solution to the problem of the destructive effect of standing waves upon the ribbon. In order to reduce the costs of the magnets, while maintaining reasonable efficiency, ribbon dimensions are kept small, thereby reducing the volume of the gap in the magnetic circuit and indirectly the volume of the magnets. Unfortunately, ribbon amplitude and sound power available decreases rapidly with a reduction in ribbon dimensions, and hence it is important to maximize the sound power available from a relatively small ribbon. Thus, ribbon amplitude fluctuations should be considerable, which in addition to the now solved standing wave problem, permits ribbon damage by an occasional amplitude peak exceeding the elastic limit of the ribbon.

It is thus highly desirable to provide a simple and economical means of limiting ribbon amplitudes to a safe value at all times while at the same time preserving desired ribbon responsiveness.

SUMMARY OF THE INVENTION

In accordance with a preferred embodiment of the present invention, an impedance matching transformer having a sharply saturable magnetic core, and a current limiting capacitor are coupled between a power amplifier and a ribbon loudspeaker to obtain the abovestated objectives.

The FIGURE depicts the protection system of the invention.

DETAILED DESCRIPTION

Reference may be made to U.S. Pat. No. 3,564,163 with respect to structural details and functional operation of a preferred ribbon loudspeaker designed by the inventor. Since this patent is incorporated by reference herein, further details will be omitted in the interest of brevity, clarity and economy.

It can be shown that the amplitude of a properly horn loaded ribbon is proportional to the time integral of the voltage applied to the ribbon. Thus, such integral should be limited in a manner not to interfere with satisfactory operation of the ribbon loudspeaker 5.

In FIG. 1, impedance matching transformer 1 matches the low impedance of the ribbon, typically a few milli-ohms to the 4 to 16 ohm output impedance of power amplifier 2. Primary winding 3 of transformer 1 is coupled to power amplifier 2 via capacitor 4. The magnetic flux of an impedance transformer is proportional to the time integral of the voltage applied to the primary winding, up to the point of saturation of the transformer. In accordance with a preferred embodiment of the present invention, a sharply saturable core 6 is employed in contrast with an ordinary impedance transformer core and thus the saturation of core 6 occurs abruptly when the time integral of the voltage exceeds a predetermined safety level. This action produces an abrupt reduction in primary inductance, which in conjunction with capacitor 4, causes a collapse of voltage across primary 3 and therefore across the ribbon. The saturation of the transformer core 6 occurs at a lower value of the voltage time integral of applied signals than the value which could cause ribbon damage. On the other hand, the core material of core 6 is designed to saturate as sharply as possible to avoid non-linear distortion at signal levels below saturation.

A current limiting device is required to prevent the impedance drop of the primary transformer winding during saturation of the core from drawing excessive power from the amplifier, which could destroy the ribbon. While it may be possible to employ an inductance or a resistance in place of capacitor 4, a capacitor or capacitive reactor is greatly preferred as the current limiting device in order to prevent inductor choking of high frequency signals, which are important with respect to the high fidelity performance of small ribbon loudspeakers. Additionally, the reactance of capacitor 4 increases as applied frequencies decrease, and thus lower frequencies are substantially attenuated to eliminate the risk of ribbon destruction, which increases as frequencies decrease. In contrast, a resistor or inductor would suffice for a bass ribbon loudspeaker which is designed to readily accommodate low frequency signals. The current limiting capacitor may conveniently constitute a series impedance of the high pass filter of a cross over network or even a portion of the power amplifier itself.

I have found that core material of sharply saturable tape wound oriented silicon steel such as "Arnold 4 mil silectron" gives excellent results with a ribbon loudspeaker design to respond in the frequency range of 400 to 20,000 HZ. A capacitor having 50 microfarads gave excellent results in conjunction with a hand wound transformer having an input impedance of 4 ohms and an output impedance of 20 milli-ohms.

For higher frequency use ferrite cores may be employed. I have used Ferroxcube cores, No. 813EE-3E2A in a 3.2 KHZ to 20 KHZ design. In this case the 4 ohm primary had 20 turns of #22 wire, with a 2 turn strip secondary. A series capacitor of 8.8 microfarads was used and the primary inductance was adjusted to 1.16 mHy by means of an air gap. The capacitor together with the primary inductance provided a high pass filter of the Butterworth N2 type having a cut off frequency of 3.2 KHZ. Saturation of the core provided complete amplitude protection for the ribbon under all listening conditions.

While preferred embodiments of the invention have been described, the teachings of this invention will readily suggest many other embodiments to those skilled in the art and thus the invention is to be limited only by the permissible scope of the following claims.

What is claimed is:

1. In combination:
   a. a ribbon loudspeaker having an input circuit;
   b. a power amplifier having an output circuit;
   c. a transformer having an input circuit coupled to the output circuit of said power amplifier and an output circuit coupled to the input circuit of said ribbon loudspeaker and a magnetic core which saturates at a value of the time integral of the voltage applied to said input circuit of said transformer low enough to prevent extraordinary large amplitude fluctuations of the ribbon of said ribbon loudspeaker; and
   d. a current limiting device for preventing said loudspeaker from drawing substantial power from said power amplifier due to saturation of said magnetic core.

2. The combination as set forth in claim 1 wherein said current limiting device comprises a capacitor for limiting the transmission of signals produced by said power amplifier which could otherwise damage said ribbon loudspeaker.

3. The combination as set forth in claim 1 wherein said core has a sharp saturation characteristic.

4. The combination as set forth in claim 2 wherein said core has a sharp saturation characteristic.

5. In combination:
   a. a ribbon loudspeaker having an input circuit;
   b. a power amplifier having an output circuit;
   c. a transformer having an input circuit coupled to the output circuit of said power amplifier and an output circuit coupled to the input circuit of said loudspeaker and a sharply saturable magnetic core which saturates at a value of the time integral of the voltage applied to said input circuit of said transformer low enough to prevent extraordinary large amplitude fluctuations of the ribbon of said ribbon loudspeaker; and
   d. a current limiting device coupled between the output circuit of said power amplifier and the input circuit of said transformer for preventing said loudspeaker from drawing substantial power from said power amplifier due to saturation of said magnetic core.

6. The combination as set forth in claim 5 wherein said current limiting device comprises a capacitor for limiting the transmission of signals produced by said power amplifier which could otherwise damage said ribbon loudspeaker.

7. In a sound reproduction system including a ribbon loudspeaker driven by a power amplifier, an improved coupling device coupled therebetween comprising:
   a. a transformer having a magnetic core which saturates at a value of the time integral of the voltage applied to said transformer low enough to prevent extraordinary large amplitude fluctuations of the ribbon loudspeaker together with a current limiting device for preventing said loudspeaker from drawing substantial power from said power amplifier due to saturation of said magnetic core.

8. The coupling device as set forth in claim 7 wherein said current limiting device comprises a capacitor for limiting the transmission of signals produced by said power amplifier which could otherwise damage said ribbon loudspeaker.

9. The coupling device as set forth in claim 7 wherein said core has a sharp saturation characteristic.

10. The combination as set forth in claim 8 wherein said core has a sharp saturation characteristic.

* * * * *